United States Patent [19]

Peeters

[11] Patent Number: 5,305,590
[45] Date of Patent: Apr. 26, 1994

[54] WHEEL RAKE

[75] Inventor: Kenneth J. Peeters, Bear Creek, Wis.

[73] Assignee: H & S Manufacturing Co., Inc., Marshfield, Wis.

[21] Appl. No.: 919,029

[22] Filed: Jul. 23, 1992

Related U.S. Application Data

[63] Continuation-in-part of Ser. No. 679,723, Apr. 3, 1991, abandoned.

[51] Int. Cl.$^5$ .................. A01D 57/12; A01D 67/00; A01D 78/14
[52] U.S. Cl. .......................... 56/377; 56/384; 56/228; 56/DIG. 21; 56/DIG. 10
[58] Field of Search ............. 56/377, 376, 228, 341, 56/11.9, 367, 366, 365, 384, DIG. 21

[56] References Cited

U.S. PATENT DOCUMENTS

| | | | |
|---|---|---|---|
| 4,077,189 | 3/1978 | Hering | 56/377 X |
| 4,183,198 | 1/1980 | Sligter | 56/377 |
| 4,214,428 | 7/1980 | Caraway | 56/341 |
| 4,245,458 | 1/1981 | Smith | 56/376 |
| 4,496,003 | 1/1985 | Bynum | 56/377 X |
| 4,723,401 | 2/1988 | Webster et al. | 56/377 |
| 4,753,063 | 6/1988 | Buck | 56/377 |
| 4,932,197 | 6/1990 | Allen | 56/377 |
| 4,947,631 | 8/1990 | Kuehn | 56/377 |
| 4,974,407 | 12/1990 | Rowe et al. | 56/377 |

Primary Examiner—Stephen J. Novosad
Attorney, Agent, or Firm—Patterson & Keough

[57] ABSTRACT

An agricultural rake especially designed for gathering wide swaths of agricultural field crops into windrows prior to baling is provided. The rake includes a primary frame, a pair of secondary rake frames pivotally and shiftably mounted to the primary frame, and a plurality or bank of radially-tined wheel rakes supported by the secondary frames. The secondary rake frames are free to pivot in a plane perpendicular to the direction of travel to prevent undo stress on the frames. Both the angle of deployment of the secondary frames as well as the distance between the frames is adjustable to accommodate different swath widths and windrow sizes. A unique rake suspension assembly provides for the easy shifting of the rake bases between the raking and transport positions while providing for desired tensioning of the rakes during raking operations and elevating the rake frames during transport. In an embodiment, castors are included to support the rake suspension assembly. Adjustable braking is provided to limit the oscillation of the castors during operation.

9 Claims, 13 Drawing Sheets

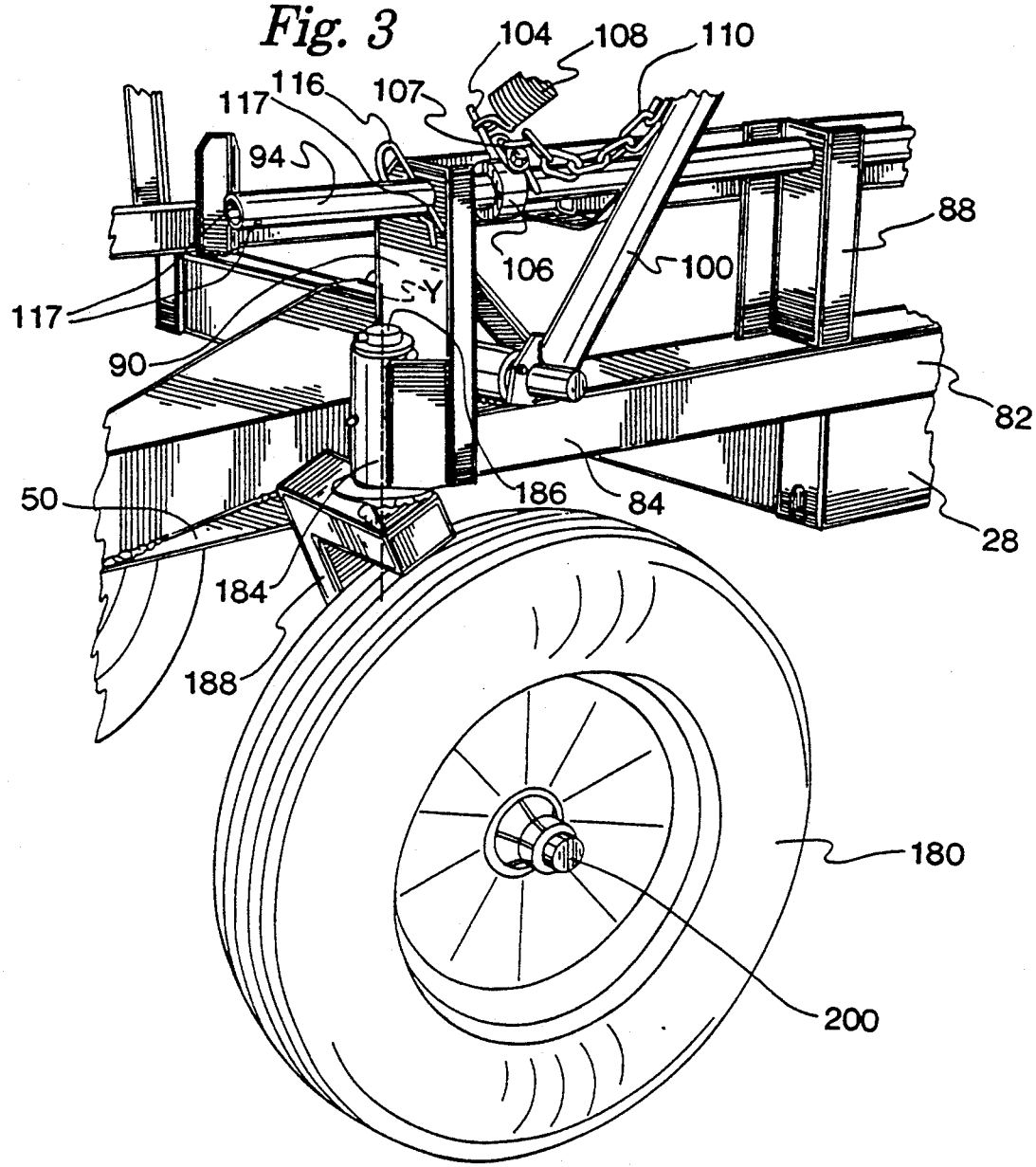
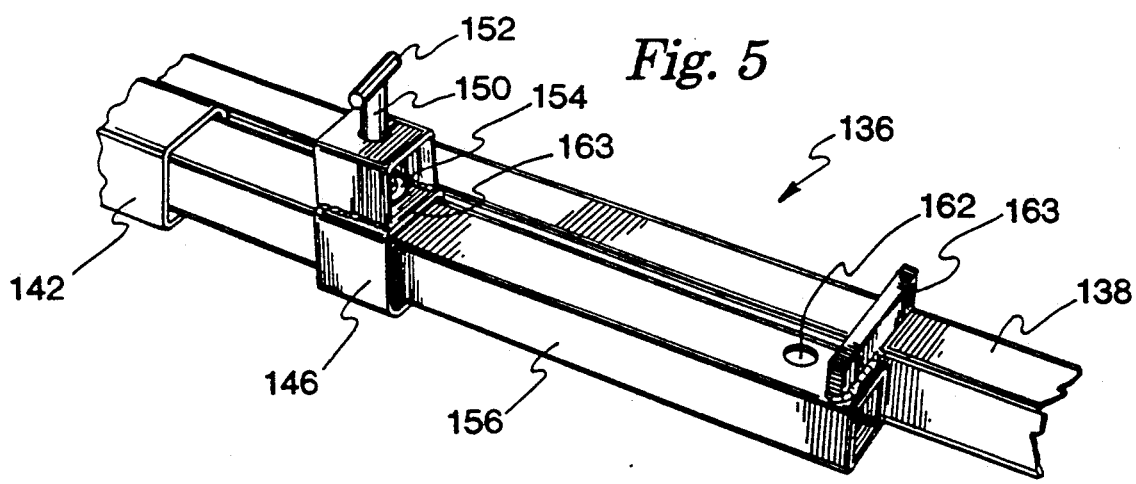

WHEEL RAKE

This is a continuation-in-part of U.S. patent application Ser. No. 07/679,723 filed Apr. 3, 1991, now abandoned.

TECHNICAL FIELD

The subject invention relates to agricultural implements. In particular, it relates to a ground powered rake for gathering harvested crops into windrows.

BACKGROUND OF THE INVENTION

A primary goal in the harvesting of hay is to dry the hay as soon as possible and remove it from direct exposure to sunlight. The hay must be dried before storage to avoid the problems of mold and spontaneous combustion. Exposing the cut hay to sunlight longer than is required to adequately dry it, however, results in unacceptable deterioration of the protein level (and therefore nutritive value) of the hay.

Typically, hay is harvested into approximately five foot swaths along the ground, and is exposed to sunlight for the initial stage of the drying process. The swaths of hay are then raked into narrow windrows to remove most of the hay from direct contact with the moist ground. The windrow enhances more air circulation within the hay, thereby hastening the drying process.

Rakes have long been used for forming swaths into windrows. Early rakes included relatively movable support frame members to control or adjust operational positions of the rake. Examples of such rake implements are disclosed in U.S. Pat. Nos. 2,925,702, 2,982,081 and 3,108,424.

Improvements in rake implements are disclosed in U.S. Pat. Nos. 4,077,189 (to Hering) and 4,245,458 (to Smith), disclosing plural rakes and telescoping adjustment structures for adjusting the width and size of windrows and the spacing of the rakes. The twin rakes disclosed in the patent to Hering include pivot hinges for the rake support structure to permit the rakes to float and to raise the outer end of the rakes into a transport position.

U.S. Pat. No. 4,723,401 (to Webster et al.) discloses a raking implement wherein a 4-bar linkage, including a hydraulically operated control link, enables an operator to steer wheels that support frame arms. A stabilizer mechanism is provided to limit the extent of pivotal movement of the frame arms. U.S. Pat. Nos. 4,183,198 (to Sligter) and 4,214,428 (to Caraway) disclose other rakes for forming single large windrows for baling hay into large roll-type bales. These rakes have a V-shape formed by two groups of rakes attached to a frame. The relative position of the groups may be varied.

U.S. Pat. No. 4,231,218 (issued to Delgado and assigned to Vicon España S.A.) discloses a rake for matching the unevenness and slopes of the ground. The rake has a wheeled main frame, a subframe formed by relatively independently pivotable arms fastened to the main frame, two board supports pivotally connected with the subframe, and rake boards arranged on the board supports.

Another improvement of the agricultural rake is represented by the Bi-Fold Hay Rake disclosed in U.S. Pat. No. 4,947,631 (to Kuehn). The Kuehn rake includes two rake supporting frames attached to one transport frame. The supporting frames are pivotally attached to the transport frame at the rear end thereof and are supported by a pair of extensible support braces.

While the above cited patents represent improvements and advances in agricultural raking implements, there are several inadequately addressed or unaddressed problems. First, as the cost of raising crops increases, it is of paramount importance to increase the efficiency of agricultural activities. Efficiency can be increased by reducing the number of passes through a field required to gather hay like crops into windrows. Thus, it is an object of the present invention to increase efficiency by providing a rake implement that enables gathering a wider swath of crop material in one pass.

A rake designed to gather wider swaths requires a frame for supporting individual rake components adequately and adjustably, yet without involving a complicated, interengaging plurality of support frame members. Additionally, it would be helpful to be able to control a rake without requiring complicated control or manipulation systems for selecting working positions.

Another difficulty is adequately isolating the rake implement from the irregularities and roughness of the ground or field surface on which it is being used. This problem is compounded by the need to gather the valuable crop as completely as possible, while providing a means for preventing damage to the rake caused by irregular ground. Thus, it is an object of the present invention to provide an improved wheel rake that increases efficiency and minimizes maintenance cost.

Additional unmet needs include the need for a structurally uncomplicated rake implement so that the owner easily may perform routine maintenance. The implement should be able to be drawn or transported safely and easily to and from fields, along standard highways and through relatively narrow gates and building doors. The implement should be able to be operated conveniently and easily by a minimum number of operational control levers or devices.

It is clear that there is a need for an efficient, simple and durable rake that substantially improves the efficiency of gathering field crops prior to baling them for storage, minimizes maintenance problems and provides for safe, efficient use and transport.

SUMMARY OF THE INVENTION

The rake of the present invention is especially designed for gathering wide swaths of agricultural field crops into windrows prior to baling the crops for storage. The rake broadly includes three components: a primary transport, structural frame, a pair of secondary rake frames and a plurality or bank of radially-tined wheel rakes coupled to the secondary frames. The secondary frames are pivotally coupled to the primary frame by shiftable mounts that allow for adjusting the distance between the two secondary frames. Self-steering support wheels are provided at the distil end of the secondary frames. Adjustable brakes are included to restrict the oscillations of the wheels during operation as desired.

A feature of the present invention is the shiftable, pivotable coupling between the primary frame and the secondary frames having at least two degrees of freedom whereby point loading in the frames and on the coupling is reduced and whereby the secondary frames may move in more than one direction.

Other features of the present invention are that the position of each secondary frame with respect to the primary frame when the operating configuration is adjustable through a wide range of angles reflecting the swath and windrow size. Additionally, ramps are provided on the primary frame to upwardly angle the secondary frames when the secondary frames are in the transport configuration.

An object of the present invention is to improve the cost efficiency of agricultural field work by providing a simple, durable improved wheel rake. Other objects, features and advantages of the present invention will become more fully apparent and understood with reference to the following specification and appended drawings and claims.

BRIEF DESCRIPTION OF THE DRAWINGS

FIG. 3 is a fragmentary perspective depicting the forward end of the left one of the pair of secondary frames of the present invention;

FIG. 5 is a fragmentary perspective view depicting a portion of the extension assembly of the right secondary frame of the present invention;

DESCRIPTION OF THE PREFERRED EMBODIMENT

Figure 1:
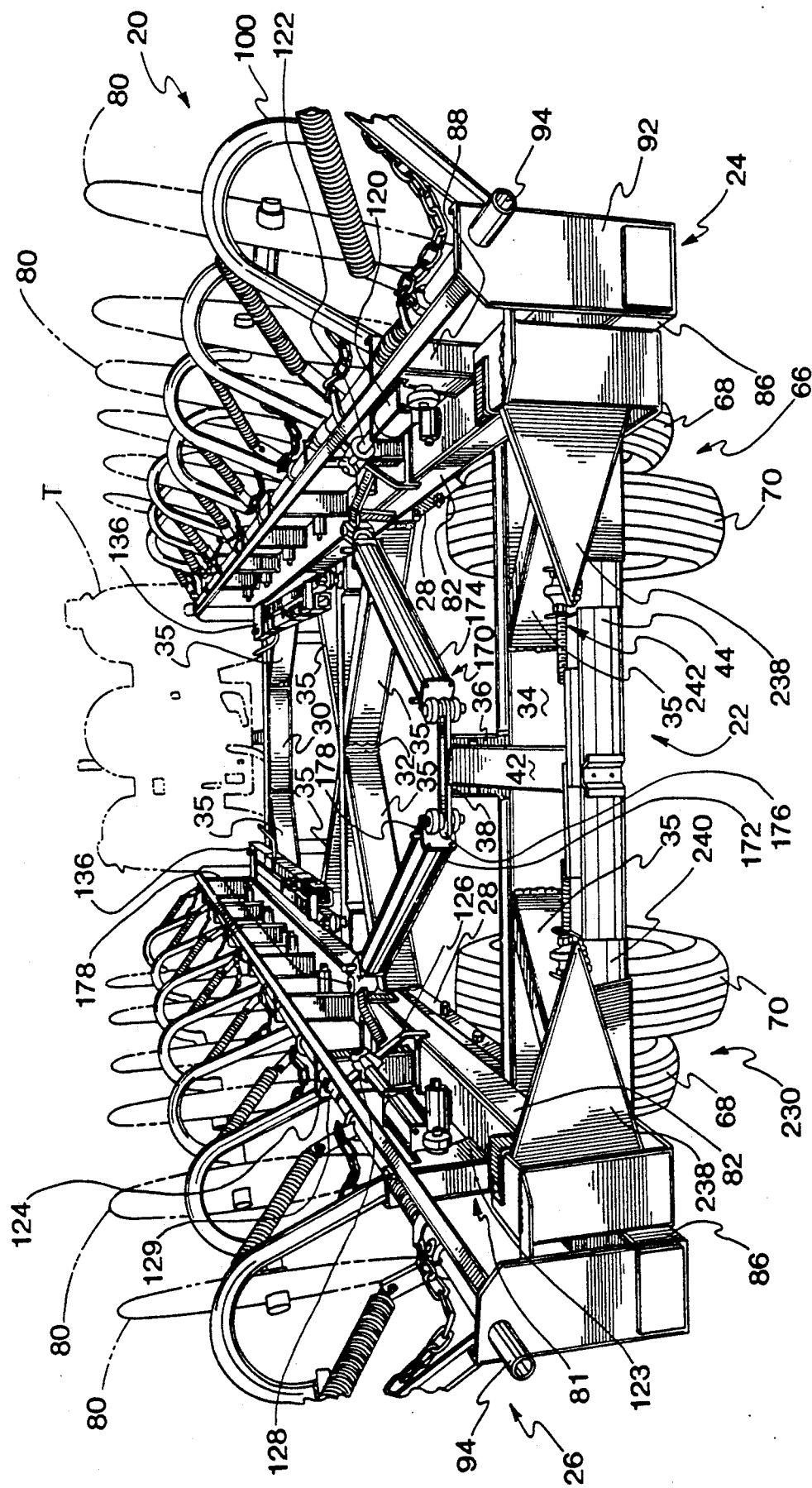
FIG. 1 is a rear perspective view depicting the wheel rake of the present invention with the individual circular, radially tined wheel rakes shown in phantom, the rake being configured in the towed position and being towed by a tractor (shown in phantom)

Referring to the drawings, the improved wheel rake 20 of the present invention includes a primary transport frame 22 and right and left side rake banks 24, 26. A tractor T is depicted in phantom.

The primary frame 22 includes two parallel elongated major side beams 28 and forward, middle and rear transverse beams 30, 32, 34. The beams 30, 32, 34 extend transversely between the side beams 28. Angle braces 35 provide additional support between the transverse beams 30, 32, 34 and the side beams 28.

An upstanding post 36 is attached to the midpoint of the rear transverse beam 34. A cross bar 38 is mounted at the top of the post 36. A draw stem 42 is connected to the post 36 and extends rearwardly to a round cross bar 44. The cross bar 44 extends the full width of the main frame 22 between the side beams 28 and is fixed to the inside surface of the beams 28 adjacent the rear ends thereof.

Figure 2:
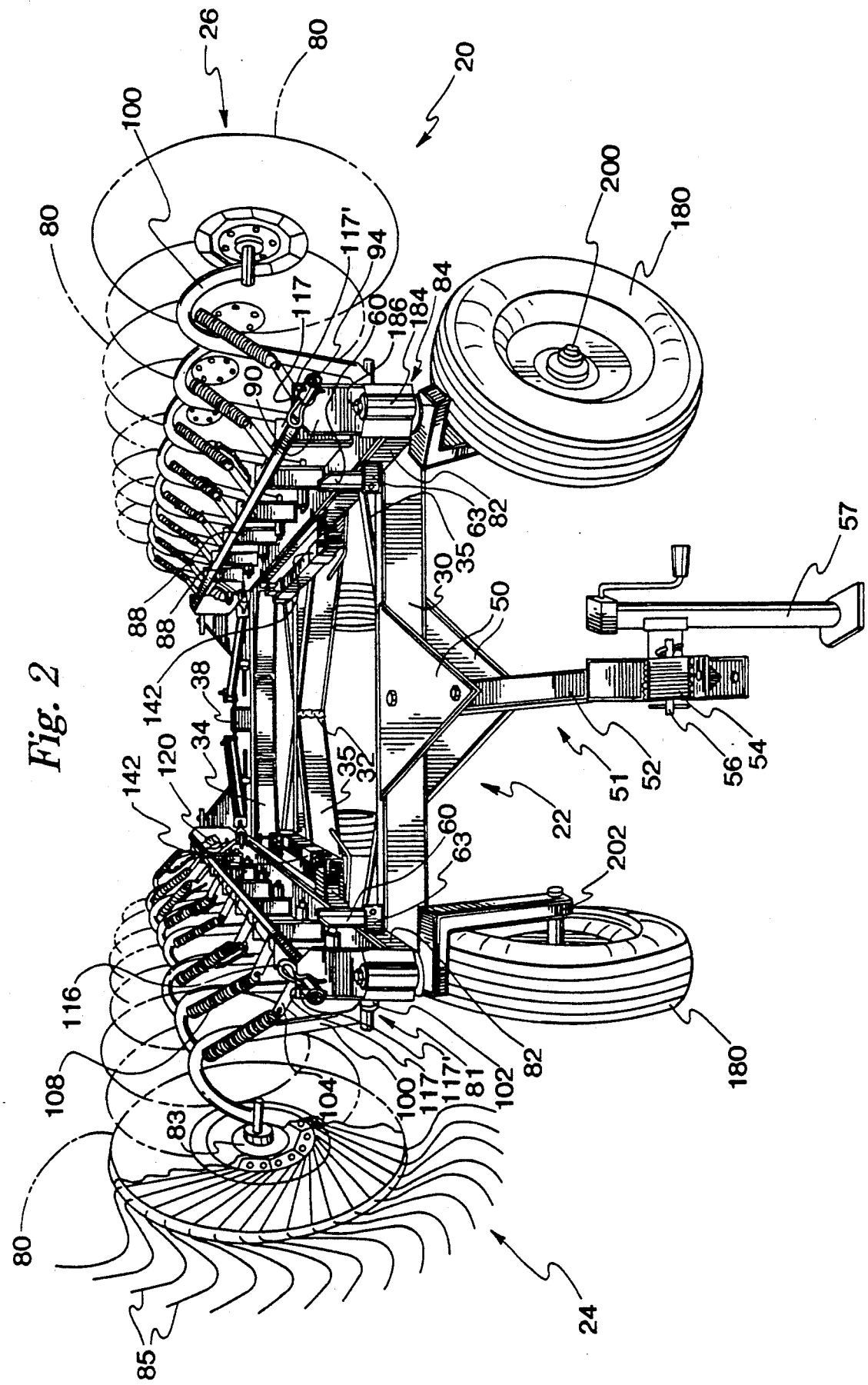
FIG. 2 is a front perspective view depicting the rake, again with portions of individual rakes shown in phantom.

At the opposite or front end of the primary frame 22, depicted in FIG. 2, a pair of upper and lower frame gussets 50 are connected to the forward transverse beam 30. A hitch assembly 51, including a tongue 52, is attached to the frame 22 by gussets 50. The tongue 52 terminates in a hitch 54 having a releasable locking hitch pin 56. A screw jack tongue support 57 is pivotally connected to the tongue 52 for lowering to the support position depicted in FIG. 2.

Figure 12:
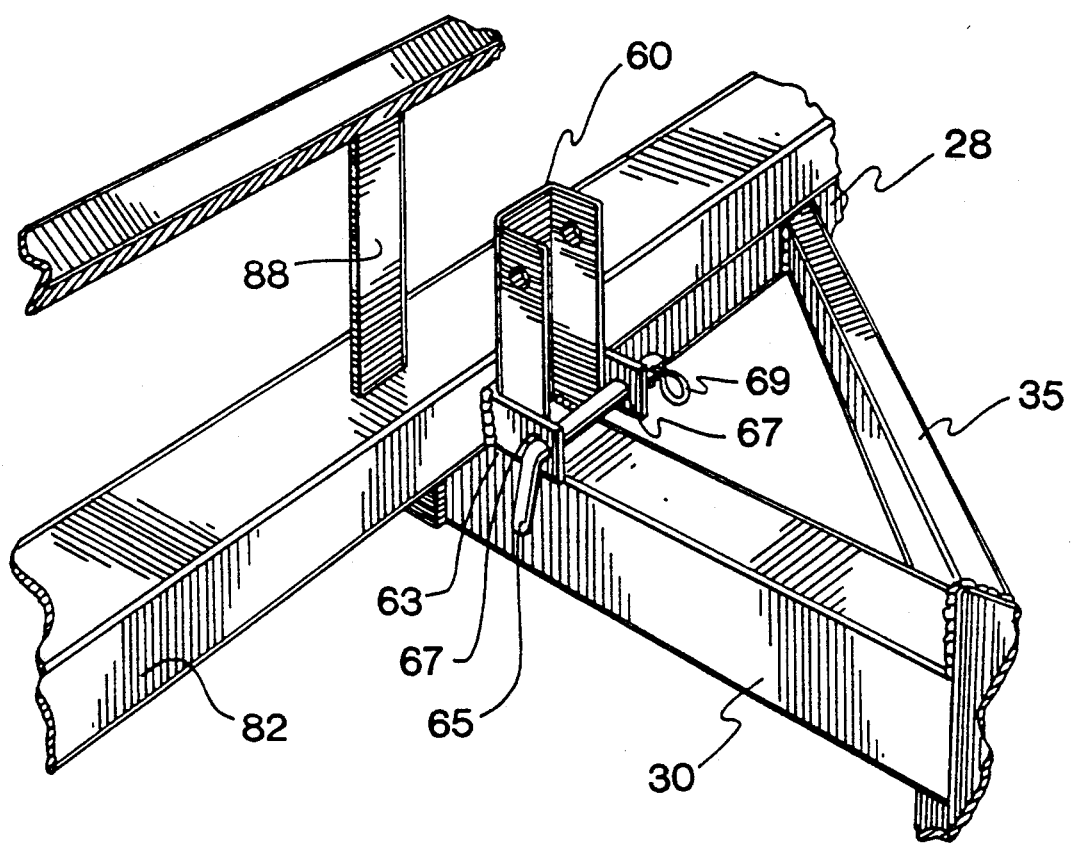
FIG. 12 is a fragmentary, perspective view depicting a bracket and cleat assembly for locking the right secondary frame in the transport position.

Referring to FIG. 12, an upstanding transport position securing bracket 60 is provided at each side of forward transverse beam 30. Referring to both FIGS. 9 and 12, a securing cleat 63 mounted on each of the rake banks 24, 26 is receivable by a respective bracket 60. A securing pin 65 is received through apertures 67 in the cleat 63, and is held in place by cotter pin 69.

Figure 10:
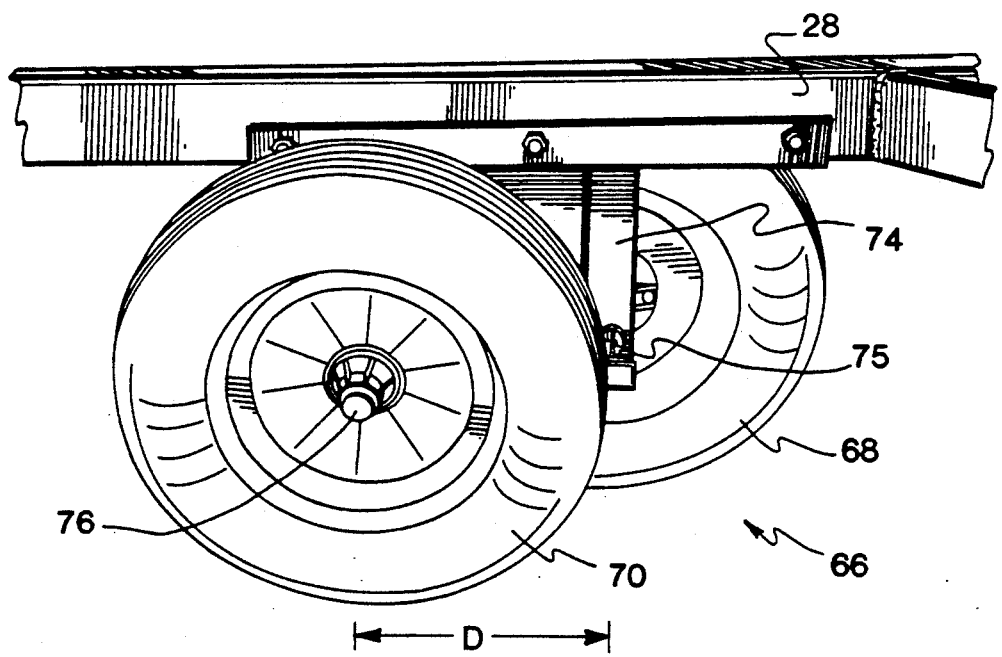
FIG. 10 is a fragmentary side perspective view depicting one of two main frame supporting wheel assemblies.

The primary transport frame 22 is supported by a pair of tandem transport wheel assemblies 66. Referring to FIG. 10, each wheel assembly 66 includes a forward wheel 68 and a rearward wheel 70. The wheels 68, 70 of each assembly are secured to the side beams 28 of the primary frame 22 by a depending wheel mount bracket 74, in a direct, unsuspended connection. The hubs 75, 76 of the transport wheels 68, 70 are offset from each other by a distance D. The offset distance D is approximately equal to the radius of a transport wheel 68, 70 and provides for an expanded effective wheelbase for the transport wheel assemblies 66.

Rake bank 24 is described below, it being understood that both banks 24, 26 are of similar design.

The rake bank 24 includes a plurality of individual wheel rakes 80 supported by a secondary frame assembly 81. The secondary frame assembly 81 includes an elongated rake beam 82 having forward end 84 and rear end 86 pivotally coupled to the primary frame 22. A plurality of upstanding braces 88, including a forward end brace 90 and a rear end brace 92, are spaced at regular intervals along the upper side of the rake beam 82. Rake positioning rod 94 is supported by the upper end of the braces 88, and extends through the forward and rear end braces 90, 92.

Figure 7:
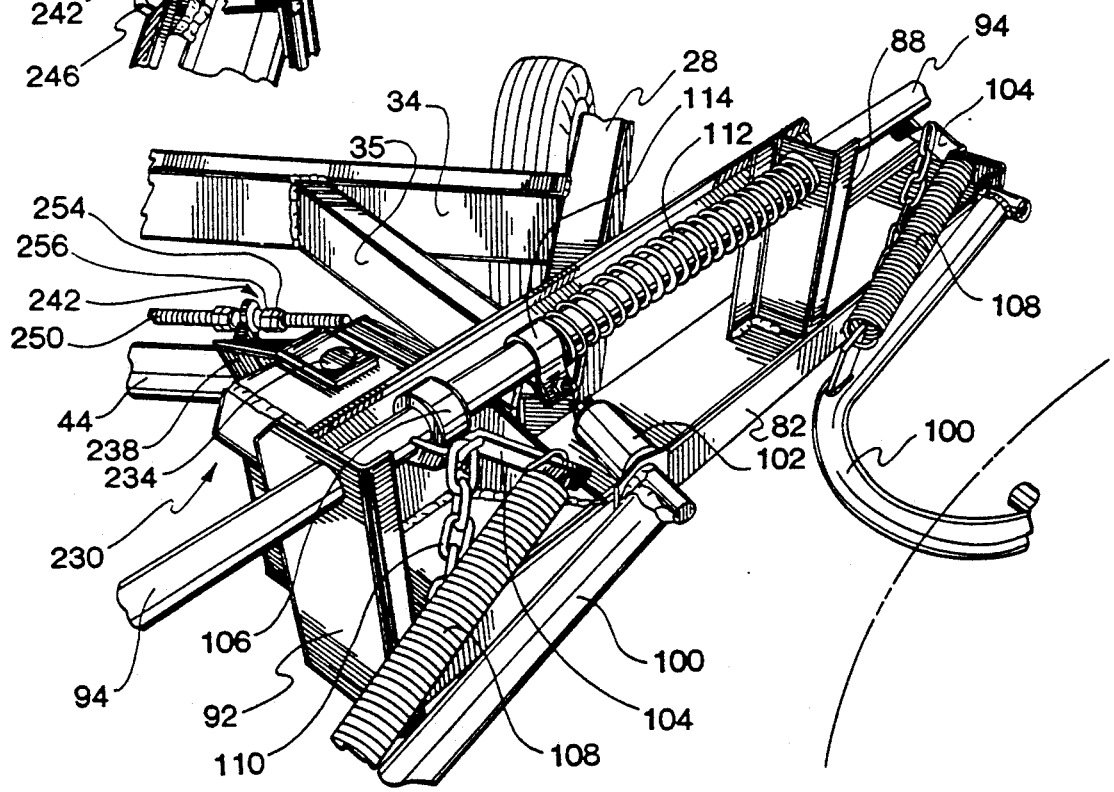
FIG. 7 is a fragmentary perspective rear view of the rake depicting additional details of the shiftable mount connecting the right secondary frame to the main frame.
Figure 20:
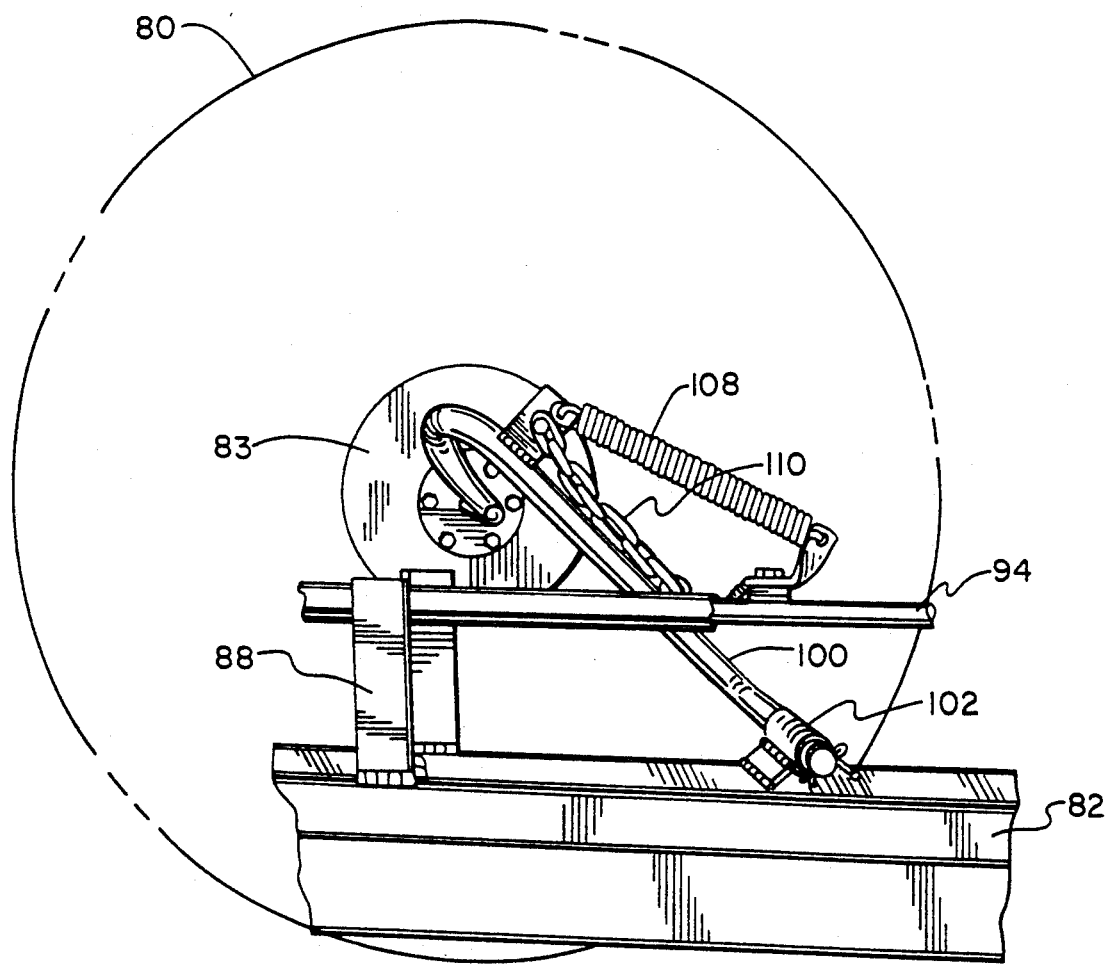
FIG. 20 is a fragmentary perspective view of the mounting of the suspension tension spring.

Referring to FIGS. 2, 3 and 7, each wheel rake 80 includes a rake hub 83 and a plurality of radially extending rake tines 85 attached to the hub 83. The rake hubs 83 are mounted on respective rake support arms 100. The rake support arms 100 are pivotally coupled to the beam 82 at rake arm mounts 102. Suspension arms 104 are mounted on collars 106, the collars 106 being secured to the rake position rod 94 by bolts 107. A suspension tension spring 108 and a suspension chain 110 are connected between each rake support arm 100 and its respective suspension arm 104. In a preferred embodiment, as depicted in FIG. 20, the connections of suspension tension spring 108 are such that each suspension tension spring 108 and the associated rake support arm 100 form a relatively small acute angle with the origin of the acute angle generally in at the end of rake support arm 100 at which wheel rake 80 is mounted.

Referring to FIG. 7, a rake position bias compression spring 112 is carried by the rake position rod 94. One end of the spring 112 abuts one of the upstanding braces 88. A bias compression adjustment collar 114 is fixed to the rake position rod 94 at the opposite end of the spring 112. Rod motion limiting cotter pin 116 is carried within pin receiving apertures 117 at the forward end of the rake position rod 94. The pin 116 may be shifted between transport position apertures 117 and raking position apertures 117'.

Figure 6:
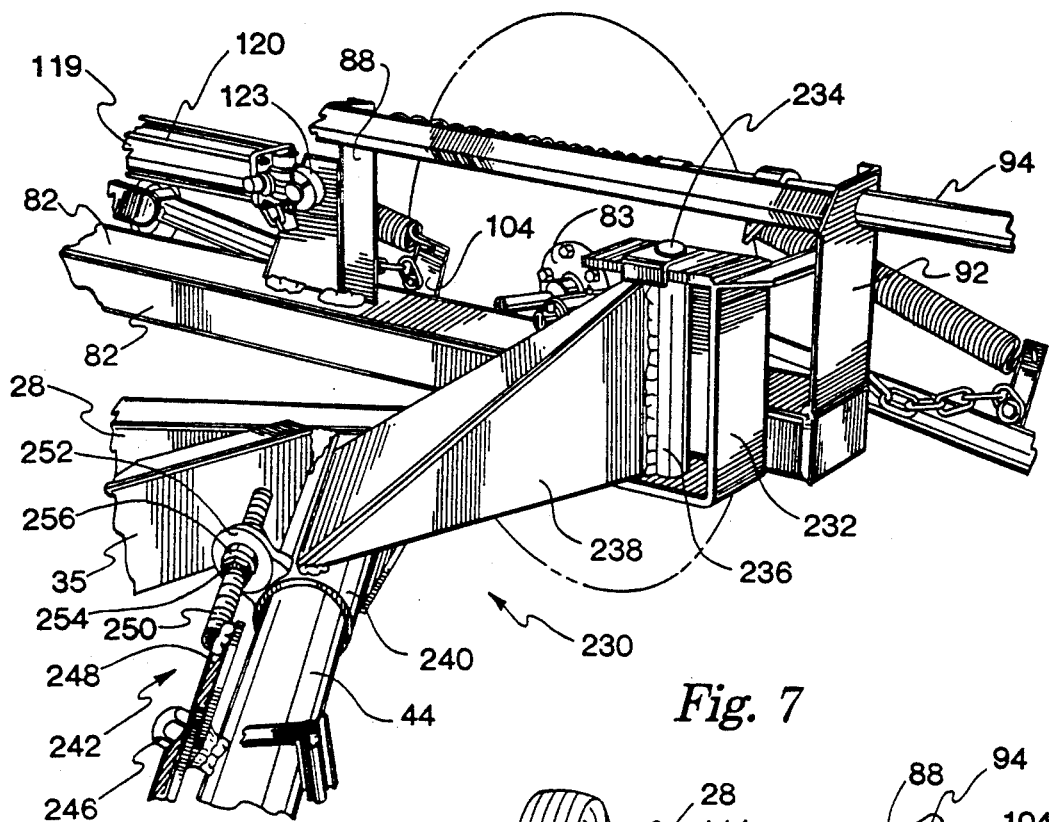
FIG. 6 is a fragmentary perspective view of the present invention depicting the shiftable mount connecting the right secondary frame to the main frame.

Referring to FIGS. 1 and 6, wheel rake positioning hydraulic piston and cylinder assembly 119, including cylinder 120 and piston 122, provides for the raising and lowering of the rakes 80 of rake bank 24, with a similar assembly provided for the raising and lowering of the rakes 80 of rake bank 26. The cylinder 120 is pivotally connected to support flange 123 adjacent one of the upstanding braces 88. The piston 122 is coupled to a drive collar 124 carried by the rake position rod 94 via torque brace 126 and clevis 128. The torque brace 126 is shiftably carried along side beam 82; the drive collar 124 is fixedly positioned on the rake position rod 94 by a tightening nut 129.

Figure 4:
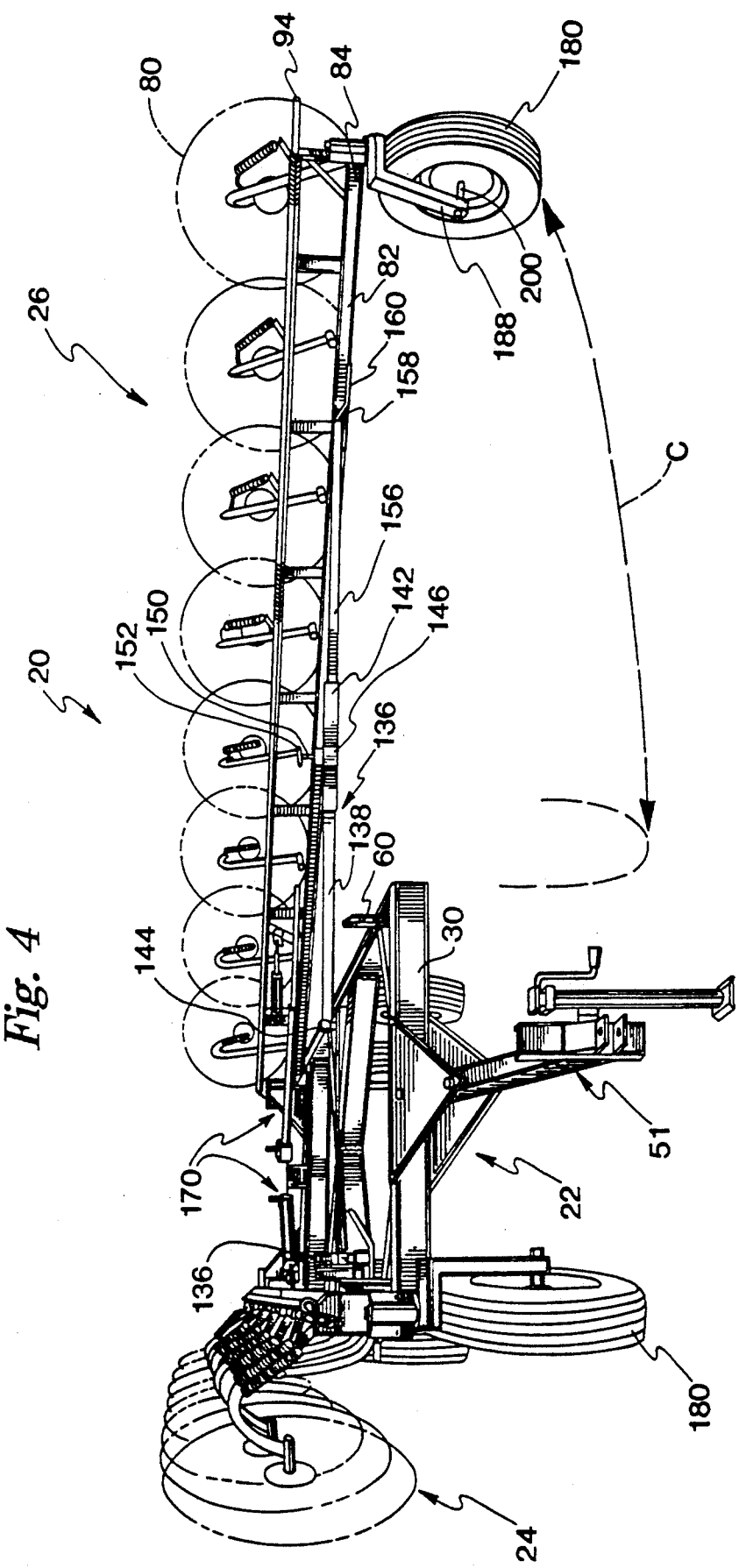
FIG. 4 is a front perspective view of the wheel rake, with one of the two rake banks deployed in the raking position.

Referring to FIGS. 4 and 5, each rake bank 24, 26 includes an extension assembly 136 connected between the primary frame 22 and the secondary frames 81. Each extension assembly 136 includes an extension base strut 138 and a square sleeve 142 fixedly attached to the strut 138. The base strut 138 is connected at one end to the primary frame 22 at a wrist mounted ball joint 144. The sleeve 142 is fixed to the strut 138 at the end opposite the connection to the frame 22.

A square extension member 156 is telescopically received in the sleeve 142. The extension member 156 is connected at its outer end to the rake beam 82 at a mounting bracket 158. A stop collar 146 is carried at the opposite end of extension member 156, engageable with the sleeve 142 carried by strut 138 to limit the outward travel of the extension member 156 relative to the strut 138. A stop pin 150 having handle 152 is carried by the collar. Stop pin compression spring 154 biases the pin 150 downwardly. A guide whisker 160 is provided near the bracket 158. The extension member 156 includes a plurality of position selecting stop holes 162 for receiving pin 150 and a top guide 163 that slideably engages the upper surface of strut 138.

Figure 13:
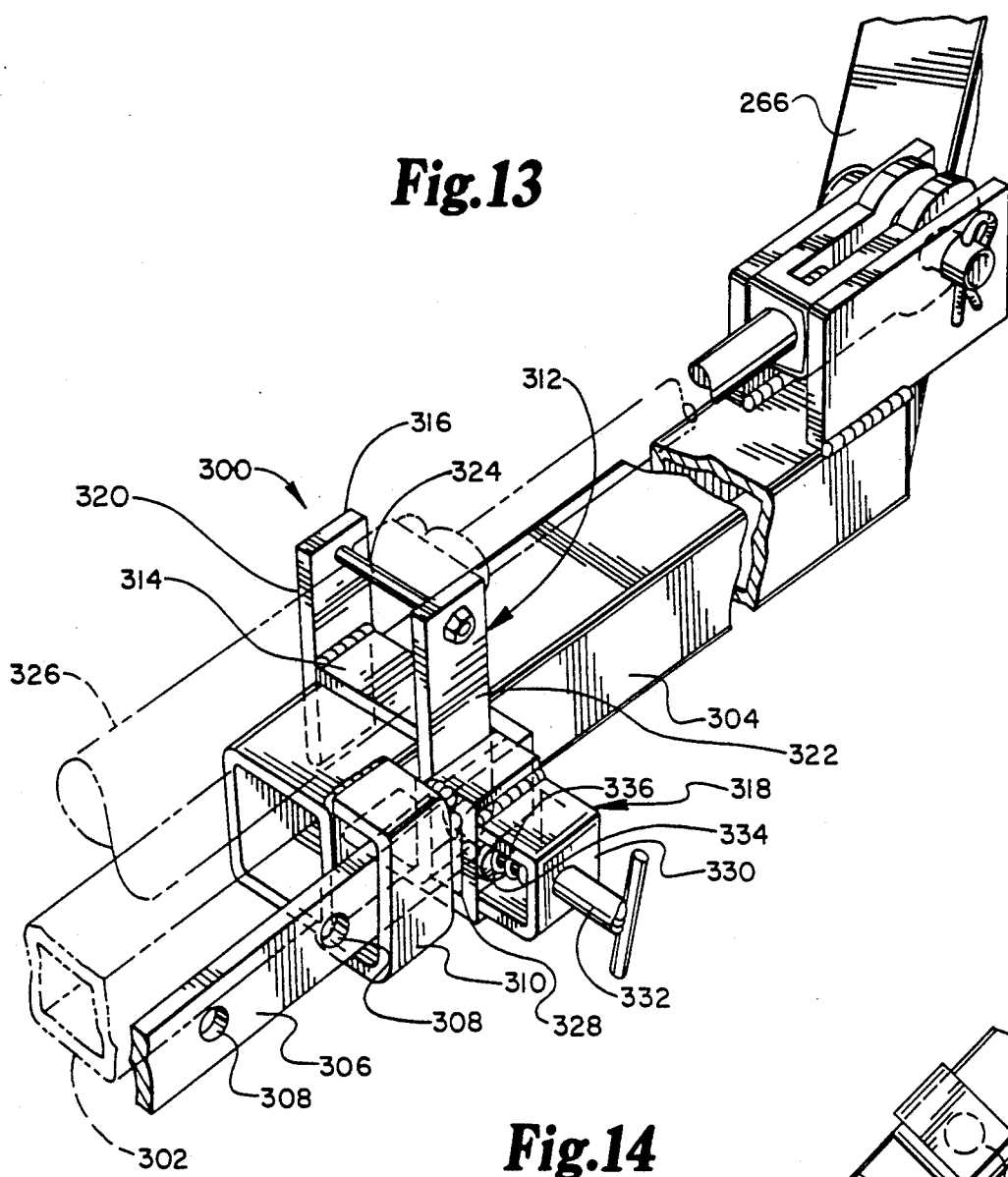
FIG. 13 is a fragmentary perspective view of an alternate form of an extension assembly for the secondary frames of the present invention.
Figure 14:
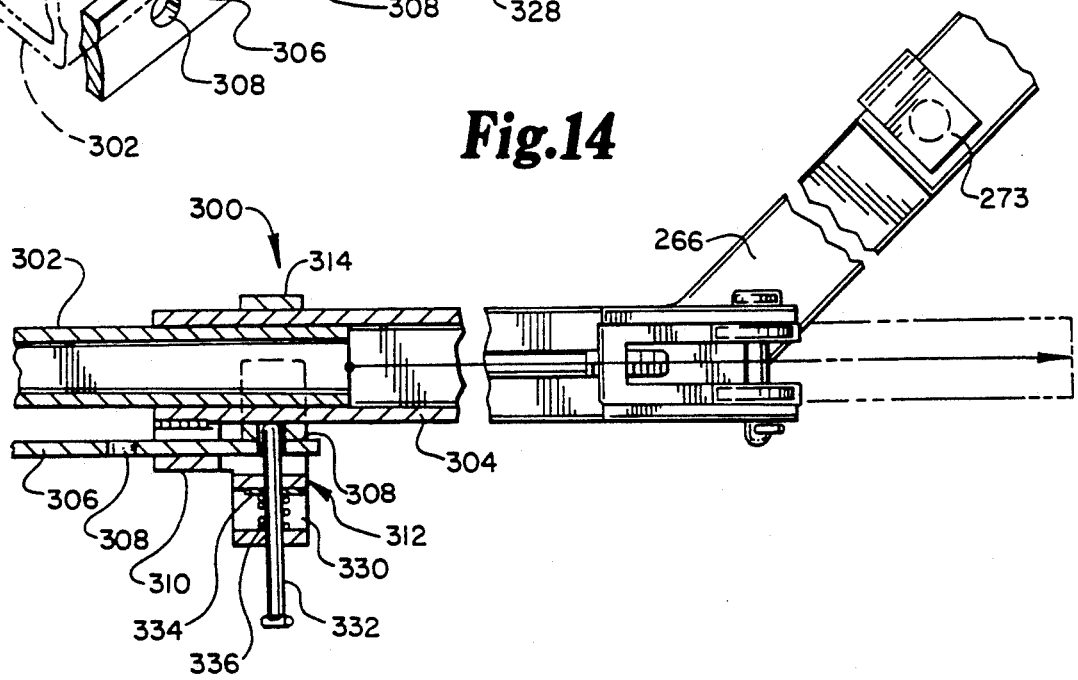
FIG. 14 is a top plan view thereof.

An alternate form of an extension assembly 300 is depicted in FIGS. 13 and 14. The extension assembly 300 includes an extension base strut 302 and an extension member 304 telescopically carried by the strut 302. A setting bar 306 is fixedly carried by the base strut 302, and includes a plurality of detents or setting holes 308. A setting bar guide 310 is carried by the extension member 304, and the setting bar 306 is received therethrough.

Stop collar 312 is slideably carried by extension member 304. Stop collar 312 includes slider assembly 314, cylinder clamp 316, and detent assembly 318. Slider assembly 314 slideably engages each of the four faces of the extension member 304. Cylinder clamp 316 includes upstanding members 320, 322 and bolt assembly 324 for securing the cylinder 326 (depicted in phantom lines in FIG. 13). Detent assembly 318 includes slider bar receiving channel 328, and stop pin supporting brace 330. Stop pin 332 is carried by the brace 330. Washer 334 is fixedly carried by stop pin 332, and stop pin 332 is biased to the detent position by compression spring 336.

Referring to FIG. 1, rake bank spreading assemblies 170 are mounted at the rear end of the primary frame 22. Each assembly 170 includes a piston and cylinder assembly 172 having a cylinder 173 and rod 174. The cylinders 173 are pivotally attached to cross bar 38. The rods 174 are pivotally connected to a respective rake beam 82.

Referring in particular to FIG. 2, self-tending, self-steering bogie support wheels 180 are carried by the rake beams 82 adjacent the forward end 84 of the beams 82. A sleeve 184 is mounted on the forward brace 90. A pivot pin 186, with a generally vertical longitudinal axis of rotation Y, is pivotally received in the sleeve 184 of rotation. The pin 186 is connected to a rake wheel strut 188. The bogie wheel axle 200 is received at the lower end 202 of the strut 188.

Figure 11:
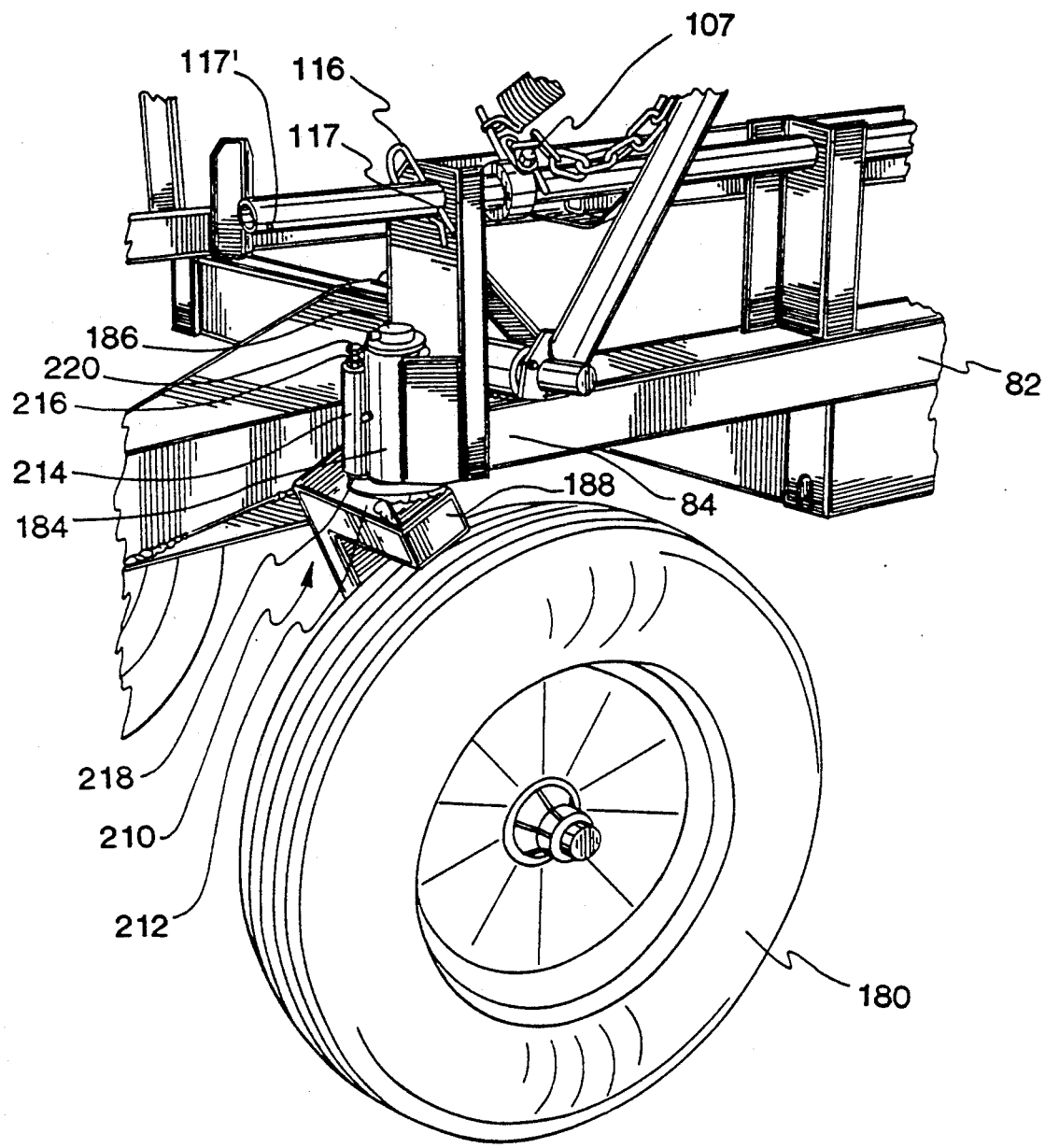
FIG. 11 is a fragmentary perspective view depicting an alternative wheel mount for mounting the secondary frame support wheel.

Referring to FIG. 11, an alternative embodiment for mounting the support wheels 180 includes a brake or damping assembly 210 for each bogie wheel 180. Specifically, a brake disk 212 is attached to the wheel strut 188 at the base of the pin 186. A plunger tube 214, parallel to the pin 186, is connected to the sleeve 184. The plunger tube 214 receives a threaded plunger 220, carrying at its lower end a brake pad 218. A jam nut 216 is threadably connected to the plunger 220 to control the braking friction between the pad 218 and disk 212.

Figure 18:
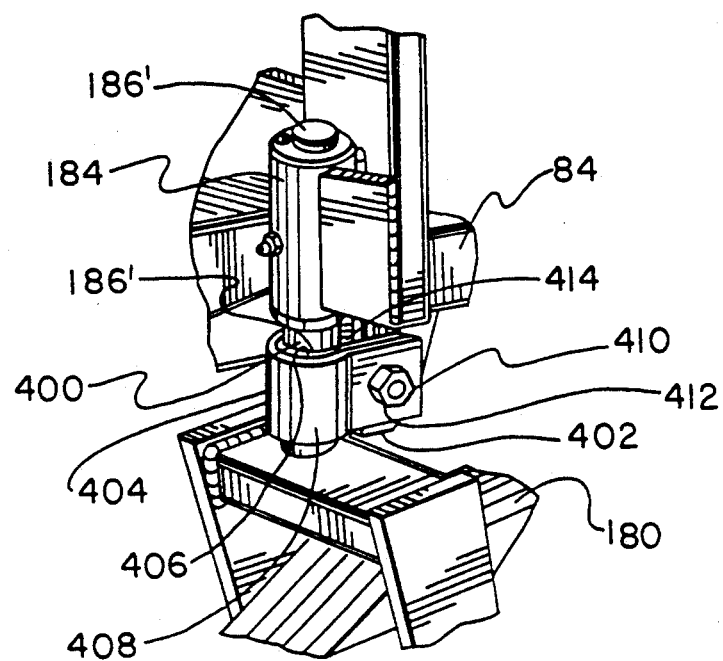
FIG. 18 is a fragmentary perspective view depicting a second alternative wheel mount for mounting the secondary frame support wheel.

Referring to FIG. 18, a second alternative embodiment for mounting the support wheels 180 includes a pin 186' having an extended shank 400. An ear 402 depends downwardly from rake beam 84. A brake band 404, having inner friction band 406 and outer tightening band 408 extends around shank 400. Adjustment nut and bolt assembly 410 extends through ear 402 and both end flanges 412, 414 of brake band 404.

Referring to FIGS. 6 and 7, shiftable joints 230 couple the primary frame 22 with respective right and left rake beams 82. A pivot bracket 232 is fixed to each rake beam 82 adjacent the rear brace 92. The pivot bracket 232 receives a generally vertical beam pivot pin 234. The pin 234 is rotatably received in a gimbal pivot pin housing 236. The gimbal pin housing 236 is fixed at one end of a gimbal support member 238 having a hollow tetrahedral body with four triangular sides. The member 238 has two ends where all four of the triangular areas intersect, the end with the housing 236 and a generally opposite end where a trunnion sleeve 240 is secured. The trunnion sleeve 240 is generally cylindrical and is shiftably carried by the round crossbar 44.

A width adjustment assembly 242 extends between a center bolt 246 carried by the round cross bar 44 and each trunnion sleeve 240. Each width adjustment assembly 242 includes a strut arm 248 directly attached to the center bolt 246 and a threaded rod 250 attached to the end of the strut arm 248. The threaded rod 250 is received in a yoke 252. Jam nuts 254 and operation nuts 256 are threadably received on the rod 250 at both sides of the yoke 252.

Figure 19:
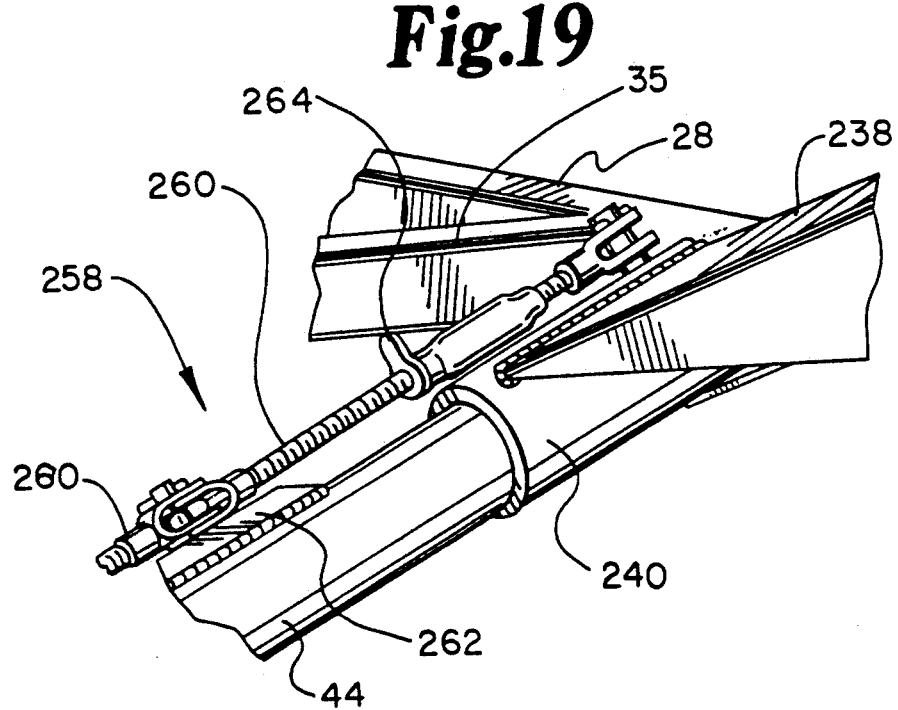
FIG. 19 is a fragmentary perspective view of an alternative width adjustment assembly.

Referring to FIG. 19, an alternate width adjustment assembly 258 comprises a pair of turnbuckle assemblies 260 extending from ear support 262 of cross bar 44 to each trunnion sleeve 240. The turnbuckle assemblies 260 include a locking key 264.

Figure 15:
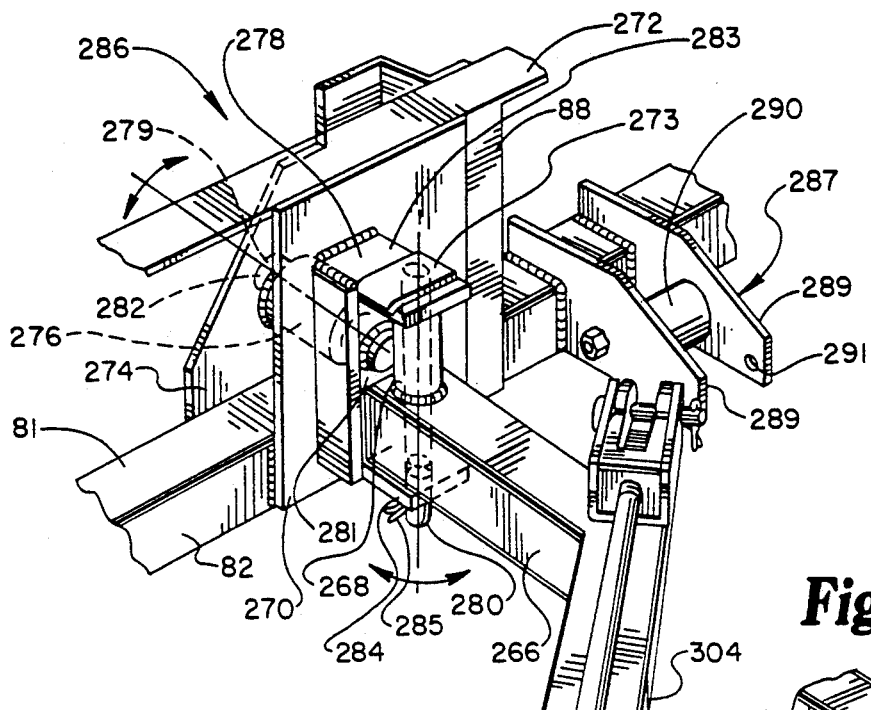
FIG. 15 is a fragmentary perspective view of an alternate form of a secondary frame, depicting an alternate form for coupling the extension assembly to the secondary frame, and including a roller assembly of a secondary frame stowage assembly.

An alternate structure for joining the extension assembly to rake beam 82 is depicted in FIG. 15. Angled arm element 266 extends from extension member 304. Tubular hinge 268 extends upwardly from the distal end of arm element 266. Coupling plate 270 is fixedly carried by rake beam 82 and top bar 272 extending along the tops of braces 88. Support gusset 274 is fixedly carried by rake beam 82 and brace 88. Journal 276 extends between the gusset 274 and coupling plate 270.

Gimbal 278, roll pin 279, and hinge pin 280 couple the arm element 266 of the extension member 304 to the coupling plate 270 of the rake beam 82. Roll pin 279 is carried by upstanding flange 281 of gimbal 278, and is rotatably received within journal 276. A cotter pin (not shown) received through the end 282 of roll pin 279, or another suitable retainer, holds the roll pin 279 in place within journal 276. Hinge pin 280 is received through opposed upper and lower flanges 283, 284 and tubular hinge 268, and is held in place therein by hinge pin head 273 and cotter pin 285.

Figure 17:
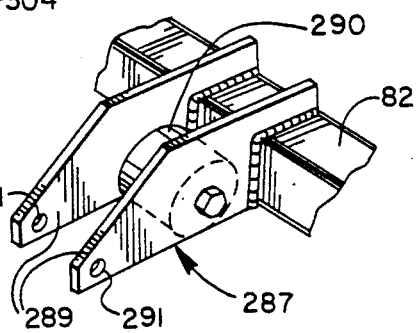
FIG. 17 is a fragmentary perspective detail view of the stowage roller assembly.
Figure 16:
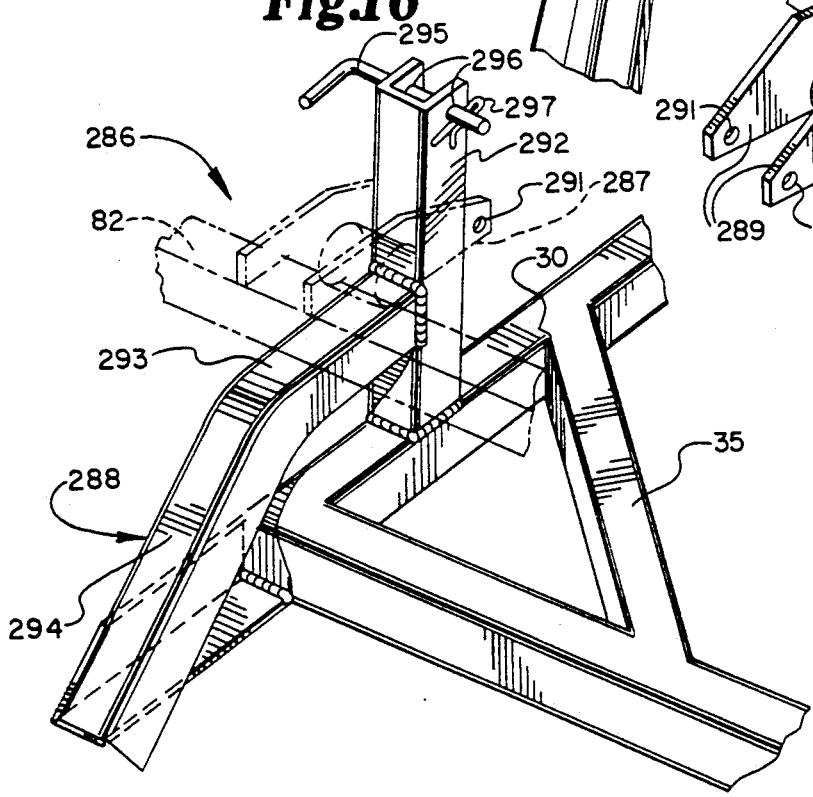
FIG. 16 is a fragmentary, perspective view of an alternate form of the primary frame, depicting a ramp assembly of the secondary frame storage assembly, with the roller assembly of FIG. 15 depicted in phantom lines.

Referring to FIGS. 15-17, secondary frame stowage assembly 286 includes roller assembly 287 carried by rake beam 82 of secondary frame assembly 81 and ramp assembly 288 carried by forward beam 30 of primary frame 22. Roller assembly 287 includes support flanges 289 and roller 290 carried by the support flanges. Each support flange 289 includes a retaining pin receiving aperture 291.

Ramp assembly 288 includes upstanding bracket 292, generally horizontal rake beam landing 293, and roller engaging ramp 294. Retaining pin 295 is stowed through apertures 296 at the upper end of upstanding bracket 292, and is held therein by cotter pin 297.

In use, the improved wheel rake 20 of the present invention may be towed to and from fields by tractor T with the banks 24, 26, and the wheel rakes 80, in the transport position depicted in FIG. 2. The wheel rakes 80 are maintained in their raised transport position by the abutment of cotter pins 116 with the forward end brace 90. The rake beams 82 are maintained in their folded, transport position by the coupling of rake bank mounted cleats 63 to primary frame mounted brackets 60.

Referring to FIG. 4, the right and left rake banks 24, 26 are swung outwardly by extending the piston and cylinder assemblies 172 of the rake bank spreading assemblies 170. The self-steering bogie wheels 180 will turn in an appropriate direction to provide the minimum amount of resistance as the banks 24, 26 are swung outwardly. Extension member 156 will shift outwardly through sleeve 142 as the respective bank 24, 26 is swung outwardly. Stop pin 150 of collar 146 is prepositioned within a desired one of the stop holes 162 of extension member 156 prior to extension of the bank 24, 26. Abutment of the collar 146 with the sleeve 142 will stop the outward swing of the respective bank 24, 26 at the desired raking angle. Adjustment of the rake bank deployment angle will determine how much crop material is collected in each pass of the rake through the field. The angle of deployment can be minimized when collecting heavy, dense crop material, and expanded to rake wider widths when appropriate.

Referring to FIG. 13, raking angle is determined with the alternate form of extension assembly 300 by prepositioning stop pin 332 in the desired setting hole 308 of setting bar 306 before the rake banks 24, 26 are swung outwardly. As cylinder 326 is extended, the extension member 304 slides outwardly along base strut 302, and setting bar guide 310 slides along setting bar 306. Abutment of the setting bar guide 310 with the stop collar 312 will stop the outward swing of the rake bank at the desired raking angle.

The width adjustment assembly 242 is used to select the width of the windrow produced by the rake 20 by adjusting the width between the trailing ends of rake banks 24, 26. Jam nuts 254 are released and the operating nuts 256 are turned in the selected direction, moving the trunnion sleeve 240 along the round crossbar 44. Trailing ends of the rake beams 82 are accordingly moved relative to each other. Each sleeve 240 may be moved approximately one-half foot along the crossbar 44, enabling an overall width adjustment of approximately two feet. It will be appreciated that windrow width is also affected by the angle at which the banks 24, 26 are deployed. As the angle is decreased, the rear wheel rakes of the banks 24, 26 move closer together. At wide angles of deployment, the width adjustment assembly would be used to spread the rear wheel rakes apart to widen windrow width.

Figure 8:
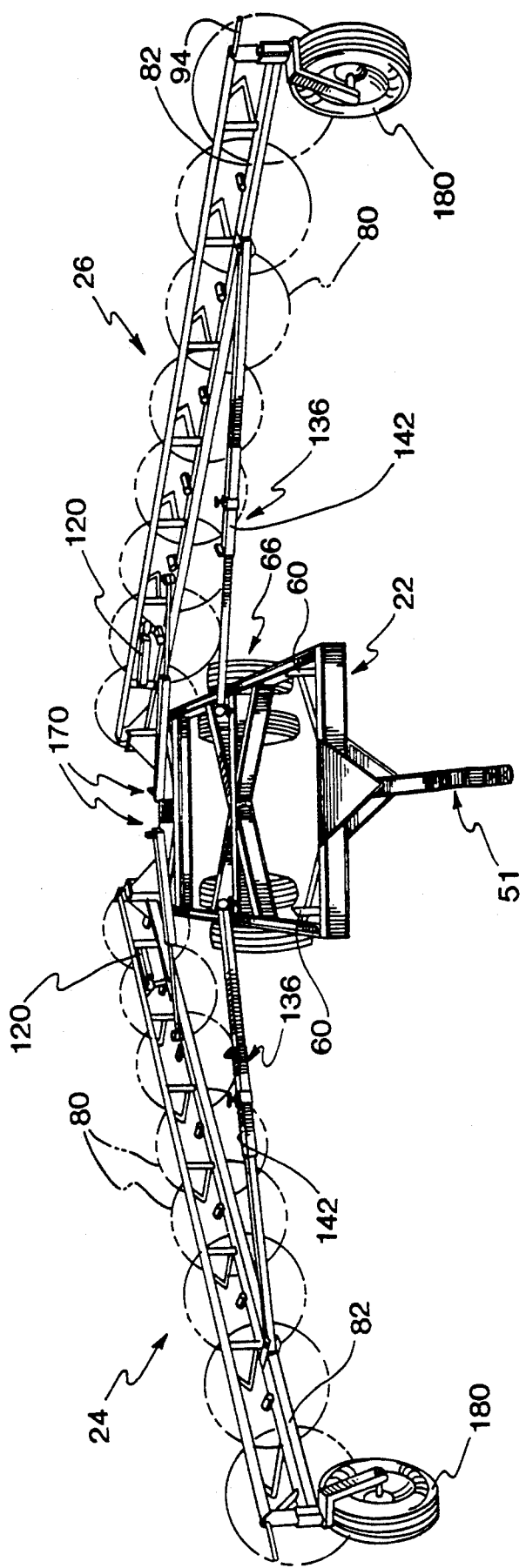
FIG. 8 is a front perspective view of the rake, with both rake banks fully deployed for operation.
Figure 9:
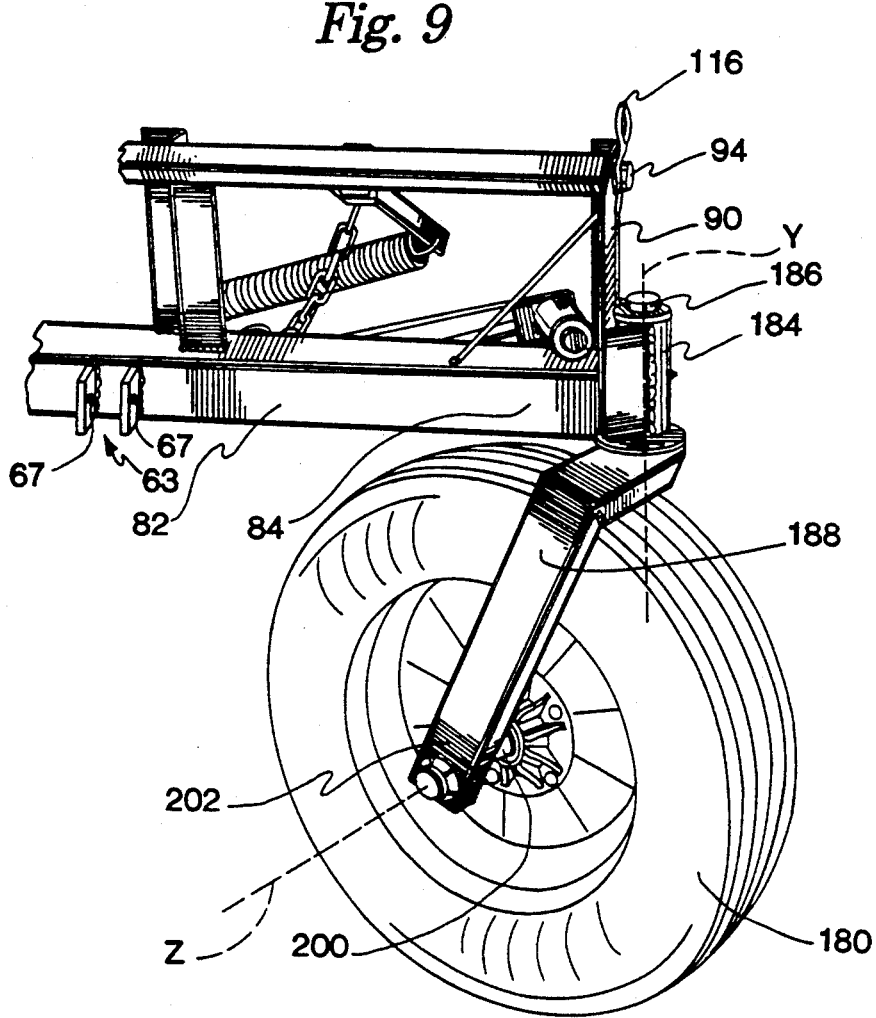
FIG. 9 is a fragmentary perspective view depicting the forward end of the left secondary frame of the rake.

The wheel rakes 80 are lowered to the raking position when the rake banks 24, 26 are fully deployed in the configuration depicted in FIG. 8. Cotter pin 116 is first shifted from the position depicted in FIG. 3 to the forward apertures 117'. Piston and cylinder assembly 120 is then retracted (by releasing pressure to the assembly 120), and rake compression spring 112 shifts rake position rod 94 rearwardly (see FIG. 7), allowing the rake support arms to shift downwardly as the suspension arms 104 shift rearwardly. Referring to FIGS. 7 and 9, the suspension arms 104 orient the frame end of tension springs 108 downwardly and away from rake position rod 94 with the rakes in the raking position. The axis of the tension springs 108 are accordingly oriented more or less coplanar with the respective support arms 100 and at an acute angle thereto. Such angle provides the optimum force vector for preventing undo bouncing of the wheel rakes 80 as wheel rakes 80 move across the uneven surface of a field. Referring to FIG. 15, it will be appreciated the alternative pivotal coupling of rake arm extension member 304 to the rake arm 82 via the roll pin 279 of gimbal 278 allows the extended rake arm 82 to follow the contour of ground without placing undo strain on the rake arm and extension member.

At the conclusion of raking operations, the rakes 80 may be raised by pressurizing the cylinder 120. The spreader assemblies 170 are activated to pull the right and left banks 24, 26 inwardly toward the sides of the primary main frame 22. The banks 24, 26 are secured in the transport position by the coupling of cleats 63 to their respective bracket 60 with pin 65.

Referring to FIGS. 15-17, the secondary frame stowage assembly 286 provides for additional lifting of the rakes 80 when secured in the transport position. More particularly, as the right and left wheel banks are moved inwardly, roller 290 of roller assembly 287 engages ramp 294 of ramp assembly 288. The roller 290 is urged up the ramp 294 as it is drawn inwardly, lifting the rake beam 82. Flanges 289 are guided past opposed sides of bracket 292. Retaining pin 295 can then be shifted from its stowed position (as in FIG. 17), to its retaining position, received through apertures 291. The individual wheel rakes 80 are accordingly held in a raised position to facilitate transportation of the rake 20.

Whether during transportation to a field or during raking operations, the lengthened effective wheelbase of the wheel assemblies 66 modulates rough, irregular surface conditions and minimizes the chance of individual wheels becoming trapped in a rut.

As the rake 20 is being towed, the self-tending bogie wheels 180 will follow the lead of the towing vehicle. That is, an imaginary line connecting the bottom end of the pin 186 and the wheel rotation axis Z will be angled from vertical because the generally vertical sleeve axis, represented by line Y in FIG. 9, is forward or ahead of the wheel rotation axis, represented by line Z in FIG. 9. This forward tilt or rake of the strut 188 causes the wheel to respond to vertical loading, following the direction of a turn. The braking or damping assembly 210 depicted in FIG. 11 may be adjusted to vary the degree of self-steer of the bogie wheels 180 if higher speed transportation is anticipated. In the second alternative embodiment depicted in FIG. 18, adjustment nut and bolt assembly 410 can be selectively tightened or loosened to exert more or less pressure on tightening band 408 and friction band 406. As pressure is applied to tightening band 408, the amount of friction between friction band 406 and shank 400 increases, thereby restricting the free rotation of the shank 400.

The gimbal joint 230 between the rake banks 24, 26 and the primary frame 22 (specifically, between the rake beams 82 and the primary frame 22) enables the rear end of each rake bank 24, 26 to move vertically. The gimbal joints 230 displace or lift the rake beams 82 above and rearwardly relative to the side beams 28 of the primary frame 22. The banks 24, 26 are moveable in a horizontal plane around the generally vertical axis of the beam pivot pin 234 in the gimbal pivot pin housing 236, and are moveable in a vertical plane around the generally horizontal axis of the round crossbar 44 in the trunnion sleeve 240. Thus, the rake banks 24, 26 have a range or degree of motion in at least two orientations or directions and each entire bank 24, 26 independently follows the contour of the land and floats relative to the primary frame 22.

What is claimed and desired to be protected by Letters Patent is:

1. An agricultural implement comprising:
a primary frame having a front end, a rear end and opposed sides;
a pair of opposed secondary frames each operably supporting a bank of ground driven wheel rakes;
joint means for operably, pivotally coupling each of said secondary frames to said primary frame; and
positioning means extending between said primary frame and each of said secondary frames for selectively positioning each of said secondary frames at one of a plurality of raking angles, said positioning means including a telescoping member operably extending between said primary frame and each of said secondary frames, shiftable between a collapsed configuration and an extended configuration, and adjustable stop means operably coupled to each of said telescoping members for determining the length of said telescoping members when in said extended configuration, said telescoping member having a first segment and a second segment operably, telescopically coupled together and further including structure defining a plurality of detents arrayed along said first segment and locking means for engaging a selected one of said detents, the locking means being operably, slideably in engagement with said first segments and being operably, slideably carried by said second segments and stop means operably carried by the second segment for limiting the extension of the telescoping member by operably engaging the locking means during extension of the telescoping member.

2. An agricultural implement comprising:
a primary frame having a front end, a rear end and opposed sides;
a pair of opposed secondary frames each operably supporting a bank of ground driven wheel rakes; and
joint means for operably, pivotally coupling each of said secondary frames to said primary frame;
said secondary frames each comprising an elongated beam for supporting said wheel rakes, each of said beams having a proximal end operably coupled to said primary support frame by said joint means and an opposed, distal end, said secondary frames each including ground engaging support wheels at said distal ends of said beams, and including castor means having an extended shank rotatably, operably carried by the distal end of the secondary beam, said secondary beam including an ear operably carried by said beam and depending downwardly from said beam alongside said shank, a brake band substantially circumscribing said shank and operably, fixedly engaged to said ear, said brake band having an inner friction surface operably engagable with said shank for applying rotational friction to said shank, and variable tightening means operably engaged to said brake band for selectively setting the frictional load on said shank.

3. An agricultural implement comprising:
a primary frame having a front end, a rear end and opposed sides;
a pair of opposed secondary frames each operably supporting a bank of ground driven wheel rakes;
joint means for operably, pivotally coupling each of said secondary frames to said primary frame; and
rake support arms operably, pivotally coupling said wheel rakes to respective ones of said secondary frames, said rake support arms having a first end operably coupled to a respective secondary frame and a second end operably coupled to a respective wheel rake, a tension spring oriented generally co-planar with each said rake support arm and having a first end operably coupled to a respective secondary frame and a second end operably coupled to the second end of a respective rake support arm, the coupling of the first end of the tension spring being at a greater lateral distance in said common plane from the first end of the rake support arm than the lateral distance that the coupling of the second end of the tension spring is displaced in said common plane from the second end of the rake support arm, such that the angle measured from said second end and formed by said spring and said support arm is a relatively small acute angle.

4. An agriculture implement comprising:

a primary frame having a front end, a rear end and opposed sides;

a secondary frame operably supporting a bank of ground driven wheel rakes shiftable between an extended position and a folded, transport position;

joint means for operably, pivotally coupling said secondary frame to said primary frame;

said secondary frame comprising an elongated beam for supporting said wheel rakes, said beam having a proximal end operably coupled to said primary support frame rear end by said joint means and an opposed, distal end engageable with said primary frame front end, and further including upwardly tending ramp means operably carried by said primary support frame front end engageable with said secondary frame distal end when said secondary frame is being folded to said transport position for elevating said distal end of said secondary frame when said secondary frame is in the folded, transport position.

5. The invention as claimed in claim 4, said guide means comprising a first portion being an upwardly tending ramp and a second portion being a transport position, the transport position being substantially parallel to and raised from said primary support frame, the secondary frame having roller means operably rotatably engageable with said guide means while the secondary frame is being folded for riding up said ramp to the transport position.

6. An agricultural implement for being drawn through a field comprising:

a primary frame having a front end, a rear end and opposed sides;

a secondary frame operably supporting a bank of ground driven wheel rakes; and joint means freely operably pivotally coupling said secondary frame to said primary support frame in at least two planes of rotation while said implement is drawn through a field for raking the rotational degree of freedom of one such plane being such that said secondary frame is free to pivot in said plane responsive to variations in the contour of the field without putting undue stress on said joint means.

7. An agricultural implement as claimed in claim 6, wherein the two planes of rotation of the joint means freely operably pivotally coupling said secondary frame to said primary support frame while said implement is drawn through a field for raking are oriented generally ninety degrees apart, with one such plane being generally horizontal to configure the implement for transport and for raking operations and the other plane being generally vertical to respond to the variations in the contour of the field.

8. An agricultural implement as claimed in claim 6, wherein the joint means comprises a first joint having a single plane of rotation operably coupled to a second joint having a single plane of rotation generally oriented at a right angle to the plane of rotation of the first joint.

9. An agriculture implement comprising:

a primary frame having a front end, a rear end and opposed sides;

a secondary frame operably supporting a bank of ground driven wheel rakes;

joint means for operably, pivotally coupling said secondary frame to said primary frame;

said secondary frame comprising an elongated beam for supporting said wheel rakes, said beam having a proximal end operably coupled to said primary support frame rear end by said joint means and an opposed, distal end engageable with said primary frame front end, and further including upwardly tending ramp means operably carried by said primary support frame front end engageable with said secondary frame distal end when said secondary frame is being folded to said transport position for elevating said distal end of said secondary frame when said secondary frame is in the folded, transport position;

said ramp means comprising a first portion being an upwardly tending ramp and a second portion being a transport position, the transport position being substantially parallel to and raised from said primary support frame, the secondary frame having roller means operably, rotatably engageable with said ramp means while the secondary frame is being folded for riding up said upwardly tending ramp to the transport position.

* * * * *